United States Patent [19]

Strzyzewski

[11] Patent Number: 5,450,910
[45] Date of Patent: Sep. 19, 1995

[54] SNOW THROWER TO LAWN CARE CONVERSION APPARATUS

[76] Inventor: Harold J. Strzyzewski, 1119 22nd St., Manistee, Mich. 49660

[21] Appl. No.: 167,169

[22] Filed: Dec. 16, 1993

[51] Int. Cl.⁶ .......................... F01B 5/12; A01B 49/00
[52] U.S. Cl. ...................................... 172/438; 172/21;
  172/247; 172/249; 172/253; 172/681; 403/188;
  403/189; 403/321; 403/338; 403/386;
  403/406.1; 403/DIG. 9
[58] Field of Search ..................... 172/438, 21, 22, 312,
  172/776, 744, 681, 684.5, 753, 247, 249, 253;
  37/241, 224, 231, 403, 468; 404/128; 403/188,
  386, DIG. 9, 405.1, 406.1, 384, 385, 393, 335,
  336, 338, 321, 187, 189; 56/DIG. 9

[56] References Cited

U.S. PATENT DOCUMENTS

| | | | |
|---|---|---|---|
| 1,035,582 | 8/1912 | Halinka | 403/386 X |
| 1,522,751 | 1/1925 | Sechler | 403/188 X |
| 1,627,422 | 5/1927 | Wike | 172/21 |
| 3,455,398 | 9/1969 | Bowers | 172/21 |
| 3,695,716 | 10/1972 | Meyer | 37/241 X |
| 3,739,856 | 6/1973 | Ray | 172/21 |
| 3,794,121 | 2/1974 | Drozak | 172/21 |
| 4,023,287 | 5/1977 | de Brito | 37/231 |
| 4,040,761 | 8/1977 | Rahn | 404/128 X |
| 5,020,602 | 6/1991 | Dellinger | 172/21 |
| 5,101,910 | 4/1992 | Dawson | 172/21 |

FOREIGN PATENT DOCUMENTS

| | | | |
|---|---|---|---|
| 688781 | 6/1964 | Canada | 403/188 |
| 3236044 | 3/1984 | Germany | 37/231 |
| 3603496 | 7/1987 | Germany | 37/231 |

*Primary Examiner*—Randolph A. Reese
*Assistant Examiner*—Christopher J. Novosad

[57] ABSTRACT

An apparatus is provided for a snow thrower which has a motor, a wheeled support for the motor, an auger, and a support for the auger. The apparatus converts the snow thrower to a lawn care apparatus. The apparatus includes a pair of lock assemblies connected to the auger support on opposite sides of the auger, support, a rollable lawn care assembly, and a pair of strut members connected at opposite ends of the rollable lawn care assembly. The strut members are adapted to connect with the lock assemblies on the auger support. Each of the lock assemblies includes a base plate attached to the auger support. A first bracket member is attached to the base plate and receives a portion of one of the strut members. A second bracket member is attached to the base plate and is spaced apart from the first bracket member such that a portion of one of the strut members is positioned between the first bracket member and the second bracket member and such that the portion of one of the strut members is locked between the first bracket member and the second bracket member, whereby the strut member is locked onto the lock assembly and the auger support. The rollable lawn care assembly may include a spiked aerator roller and a water-ballasted roller.

4 Claims, 3 Drawing Sheets

SNOW THROWER TO LAWN CARE CONVERSION APPARATUS

BACKGROUND OF THE INVENTION

1. Field of the Invention

The present invention relates generally to lawn care apparatus and, more particularly, to apparatus especially adapted for converting a snow thrower into a lawn care apparatus.

2. Description of the Prior Art

Snow throwers are useful devices that are used to clear sidewalks and the like of snow. A snow thrower generally includes a motor, a wheeled support for supporting the motor, an auger powered by the motor, and a support for the auger. Unfortunately, in some locales, snow does not occur very often, and the snow thrower is not used often during the year. In this respect, it would be desirable if a snow thrower could be adapted to be used during times when not needed for throwing snow.

As mentioned above, a typical snow thrower includes a wheeled support for supporting the motor and a support for the motor-driven auger. Many land-treating machines also employ a wheeled support and a support for supporting a land-treating tool. With this in mind, it would be desirable if the wheeled motor support and the support for the auger could be used for supporting other land-treating tools besides a snow thrower auger.

During the seasons of spring, summer, and autumn, people are often concerned about treating their land and lawn. Land-treating tools that are used for treating land generally and lawns specifically include spiked aerator rollers and smooth, water-ballasted rollers. In this respect, it would be desirable if a snow thrower could be adapted to be used as a spiked aerator roller and a smooth, water-ballasted roller.

For a snow thrower that is adapted to be used as a spiked aerator roller and a smooth, water-ballasted roller, it would be desirable that a common connector be provided on the auger support for interchangeably supporting a spiked aerator roller and a smooth, water-ballasted roller. In this respect, it would also be desirable if each of the spiked aerator roller and the smooth, water-ballasted roller be provided with a complementary connector that is interchangeable with the connector on the auger support.

Some snow throwers employ their motor to drive the auger only. Other snow throwers employ their motor to both drive the auger and propel the device along a path. The later type of snow thrower is a self-propelled snow thrower. Similarly, a spiked aerator roller and a smooth, water-ballasted roller can be self-propelled. In this respect, it would be desirable if a self-propelled snow thrower could be adapted to become a self-propelled spiked aerator roller or a self-propelled smooth, water-ballasted roller.

Throughout the years, a number of innovations have been developed relating to land-treating devices, and the following U.S. patents are representative of some of those innovations: U.S. Pat. Nos. 3,455,398; 3,739,856; 3,794,121; 5,020,602; and 5,101,910.

More specifically, U.S. Pat. No. 3,455,398 discloses an attachment for a power lawnmower that utilizes the engine of the power lawn mower for a rake and a lawn aerator. The attachment includes a gear box adapted to receive power from the motor of the lawn mower. Generally, the normal drive of a power lawn mower provides power to a vertically oriented shaft onto which the lawn mower blade is attached. The gearing in the aforementioned patent permits conversion of the power from a vertically oriented shaft to a horizontally oriented shaft. Such a mechanism is a complex device. In this respect, it would be desirable if a device were provided which permitted a snow thrower to be converted to a lawn-treating device without using a mechanism for converting a vertically oriented power shaft to a horizontally oriented power shaft.

U.S. Pat. Nos. 3,739,856, 3,794,121, 5,020,602, and 5,101,910 disclose aerator attachments for self-propelled, motor-driven tractors. Generally, tractors include seats and relatively powerful motors and are not suitable for snow throwing. The above-mentioned patents make no disclosure of converting a snow thrower to lawn-treating use.

Thus, while the foregoing body of prior art indicates it to be well known to use lawn care devices, the prior art described above does not teach or suggest a snow thrower to lawn care conversion apparatus which has the following combination of desirable features: (1) can be adapted to be used during times when not needed for throwing snow; (2) can be used for driving and supporting other land-treating tools besides a snow thrower auger; (3) used as a spiked aerator roller and a smooth-water-ballasted roller; (4) provides a common connector on the auger support for interchangeably supporting a spiked aerator roller and a smooth-water-ballasted roller; (5) provides a complementary connector on each of the spiked aerator roller and the smooth-water-ballasted roller that is interchangeable with the connector on the auger support; (6) can be adapted to become a self-propelled spiked aerator roller or a self-propelled smooth, water-ballasted roller; (7) permits a snow thrower to be converted to a lawn-treating device without using a mechanism for converting a vertically oriented power shaft to a horizontally oriented power shaft; and (8) provides hardware for retrofitting a snow thrower into a lawn-treating device. The foregoing desired characteristics are provided by the unique snow thrower to lawn care conversion apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an apparatus for a snow thrower which has a motor, a wheeled support for the motor, an auger, and a support for the auger. The apparatus converts the snow thrower to a lawn care apparatus. The apparatus includes a pair of lock assemblies connected to the auger support on opposite sides of the auger support, a rollable lawn care assembly, and a pair of strut members connected at opposite ends of the rollable lawn care assembly. The strut members are adapted to connect with the lock assemblies on the auger support.

Each of the lock assemblies includes a base plate attached to the auger support. A first bracket member is attached to the base plate. The first bracket member receives a portion of one of the strut members. A second bracket member is attached to the base plate. The second bracket member is spaced apart from the first bracket member such that a portion of one of the strut members is positioned between the first bracket member and the second bracket member and such that the portion of one of the strut members is locked between the first bracket member and the second bracket member, whereby the strut member is locked onto the lock assembly and the auger support.

The second bracket member includes a plurality of adjustment slots for adjusting a space between the first bracket member and the second bracket member along the base plate.

The rollable lawn care assembly includes a spiked aerator roller. The rollable lawn care assembly includes a water-ballasted roller. The water-ballasted roller includes a filler assembly which permits addition of water to an interior chamber of a roller element.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a snow thrower to lawn care conversion apparatus which has all of the advantages of the prior art and none of the disadvantages.

It is another object of the present invention to provide a snow thrower to lawn care conversion apparatus which may be easily and efficiently manufactured and marketed.

It is a further object of the present invention to provide a snow thrower to lawn care conversion apparatus which is of durable and reliable construction.

An even further object of the present invention is to provide a snow thrower to lawn care conversion apparatus which is susceptible of a low cost of manufacture with regard to both materials and labor, and which accordingly is then susceptible of low prices of sale to the consuming public, thereby making such snow thrower to lawn care conversion apparatus available to the buying public.

Still yet a further object of the present invention is to provide a snow thrower to lawn care conversion apparatus which can be adapted to be used during times when not needed for throwing snow.

Still another object of the present invention is to provide a snow thrower to lawn care conversion apparatus that can be used for driving and supporting other land-treating tools besides a snow thrower auger.

Yet another object of the present invention is to provide a snow thrower to lawn care conversion apparatus which used as a spiked aerator roller and a smooth-water-ballasted roller.

Even another object of the present invention is to provide a snow thrower to lawn care conversion apparatus that provides a common connector on the auger support for interchangeably supporting a spiked aerator roller and a smooth-water-ballasted roller.

Still a further object of the present invention is to provide a snow thrower to lawn care conversion apparatus which provides a complementary connector on each of the spiked aerator roller and the smooth-water-ballasted roller that is interchangeable with the connector on the auger support.

Yet another object of the present invention is to provide a snow thrower to lawn care conversion apparatus that can be adapted to become a self-propelled spiked aerator roller or a self-propelled smooth, water-ballasted roller.

Still another object of the present invention is to provide a snow thrower to lawn care conversion apparatus which permits a snow thrower to be converted to a lawn-treating device without using a mechanism for converting a vertically oriented power shaft to horizontally oriented power shaft.

Yet another object of the present invention is to provide a snow thrower to lawn care conversion apparatus that provides hardware for retrofitting a snow thrower into a lawn-treating device.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a snow thrower to lawn care conversion apparatus embodying the principles and concepts of the present invention will be described.

Figure 1:
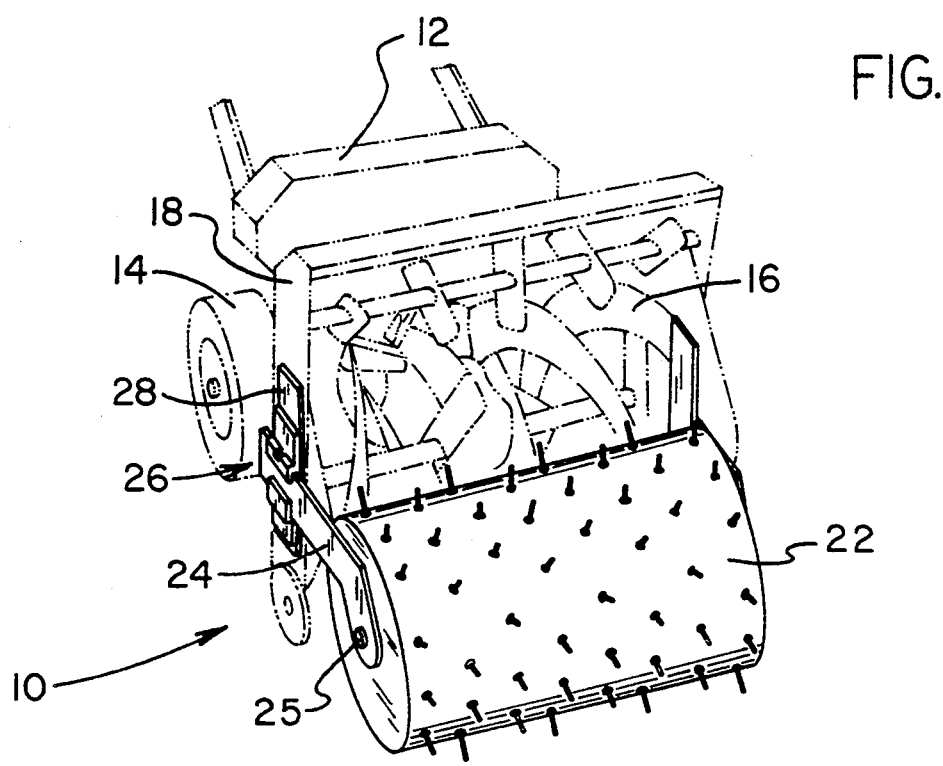
FIG. 1 is a perspective view showing a first embodiment of the snow thrower to lawn care conversion apparatus of the invention used with a spiked aerator roller.
Figure 2:
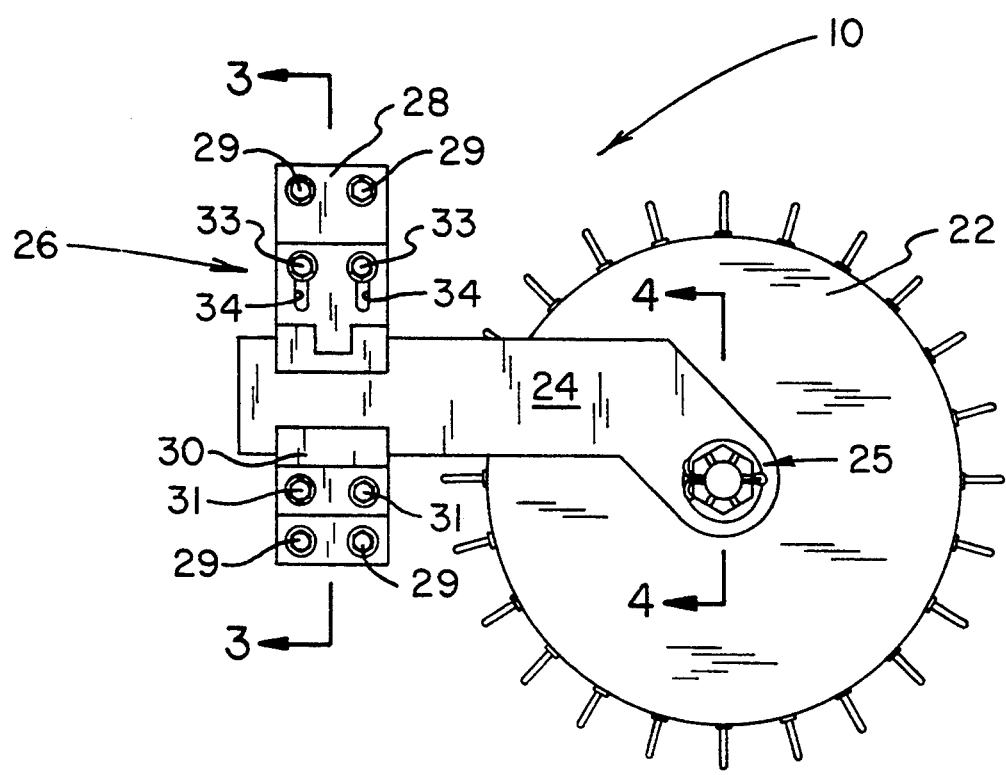
FIG. 2 is an enlarged side view of the embodiment of the invention shown in FIG. 1.
Figure 3:
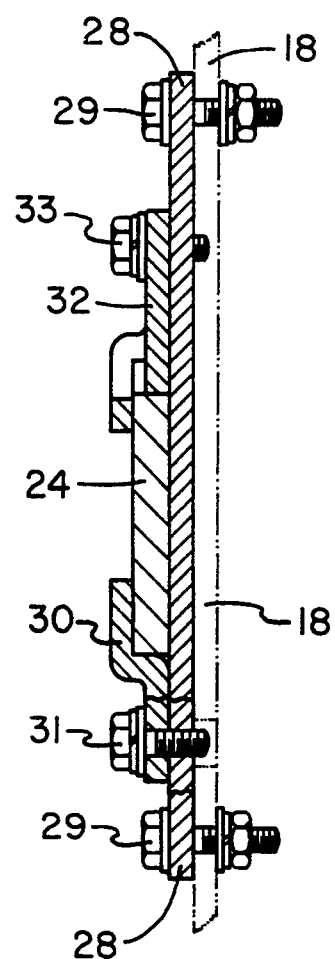
FIG. 3 is an enlarged cross-sectional view of the connector assembly of the embodiment of the invention shown in FIG. 2 taken along line 3—3 thereof.
Figure 4:
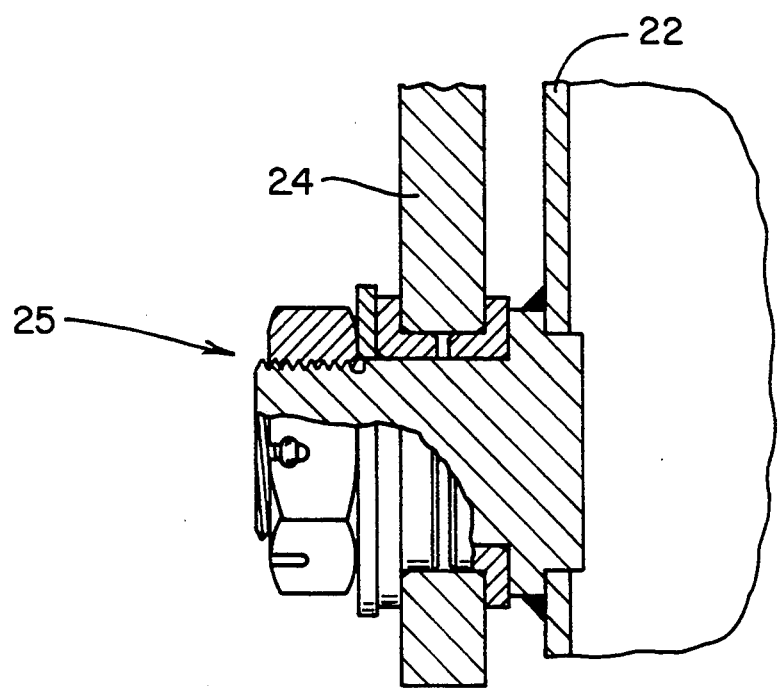
FIG. 4 is an enlarged cross-sectional view of the end of the bearing assembly of the embodiment of the invention shown in FIG. 2 taken along line 4—4 thereof.

Turning initially to FIGS. 1–4, there is shown a first exemplary embodiment of the apparatus for converting a snow thrower to a lawn care apparatus. The snow thrower has a motor 12, a wheeled support 14 for the motor 12, an auger 16, and a support 18 for the auger 16. In its preferred form, the snow thrower to lawn care conversion apparatus 10 includes a pair of lock assemblies 26 connected to the auger support 18 on opposite sides of the auger support 18, a rollable lawn care assembly 22, and a pair of strut members 24 connected at opposite ends of the rollable lawn care assembly 22. The strut members 24 are adapted to connect with the lock assemblies 26 on the auger support 18. As shown in FIGS. 1 and 2, the rollable lawn care assembly 22 is connected to the strut members 24 by bearing assemblies 25.

Each of the lock assemblies 26 includes a base plate 28 attached to the auger support 18. The base plate 28 is attached to the auger support 18 with sets of nuts and bolts 29 first bracket member 30 is attached to the base plate 28 with nuts and bolts 31. The first bracket member 30 receives a portion of one of the strut members 24. A second bracket member 32 is attached to the base plate 28 with nuts and bolts 33. The second bracket member 32 is spaced apart from the first bracket member 30 such that a portion of one of the strut members 24 is positioned between the first bracket member 30 and the second bracket member 32 and such that the portion of one of the strut members 24 is locked between the first bracket member 30 and the second bracket member 32, whereby the strut member 24 is locked onto the lock assembly 26 and the auger support 18. When each respective strut member 24 is locked to each respective lock assembly 26, the rollable lawn care assembly 22 is attached to the auger support 18 of the snow thrower, and the snow thrower becomes converted into a lawn care device.

The second bracket member 32 includes a plurality of adjustment slots 34 for adjusting a space between the first bracket member 30 and the second bracket member 32 along the base plate 28.

In use, on each lock assembly 26, nuts and bolts 33 are loosened, and the second bracket member 32 is raised to make a large space between the second bracket member 32 and the first bracket member 30. A portion of the respective strut members 24 are placed on the respective first bracket members 30. Then the respective second bracket members 32 are lowered to encompass the strut members 24 to sandwich the strut members 24 between the second bracket member 32 and the first bracket member 30. As the second bracket member 32 is either raised or lowered, the movement of the second bracket member 32 is guided by the adjustment slots 34 and their contact with the nuts and bolts 33. Then, the nuts and bolts 33 are tightened to lock the respective strut members 24 onto the respective lock assemblies 26.

If it is desired that the lawn care apparatus of the invention be self-propelled, then the drive mechanism from the motor to the wheels is left connected to the wheels. However, if it is desired that the lawn care apparatus of the invention be pushed by the user, then the drive mechanism from the motor to the wheels is disconnected from the wheels. In addition, in using the lawn care apparatus of the invention, the drive mechanism for the auger can be disconnected from the auger.

The elements of the apparatus of the invention for converting a snow thrower to a lawn care device can be sold in combination as a kit for retrofitting the snow thrower.

As shown in FIGS. 1 and 2, the rollable lawn care assembly 22 includes a spiked aerator roller 22. If desired, the spikes of the roller 22 can be removed to provide a roller devoid of spikes.

Figure 5:
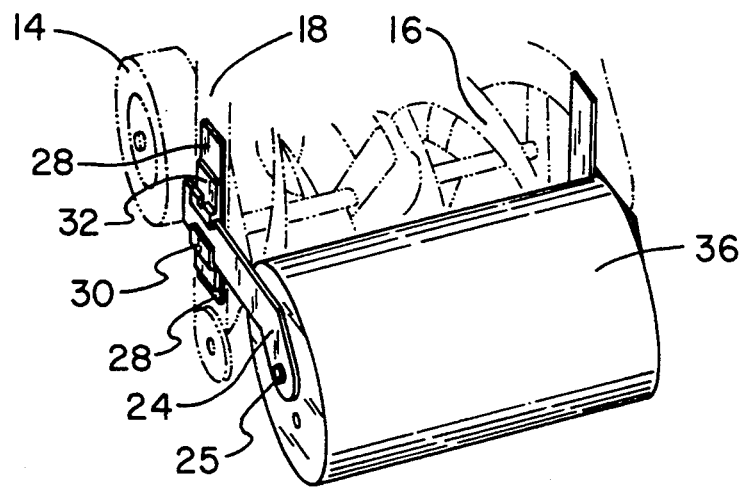
FIG. 5 is a perspective view showing a second embodiment of the snow thrower to lawn care conversion apparatus of the invention used with a water-ballasted roller.
Figure 6:
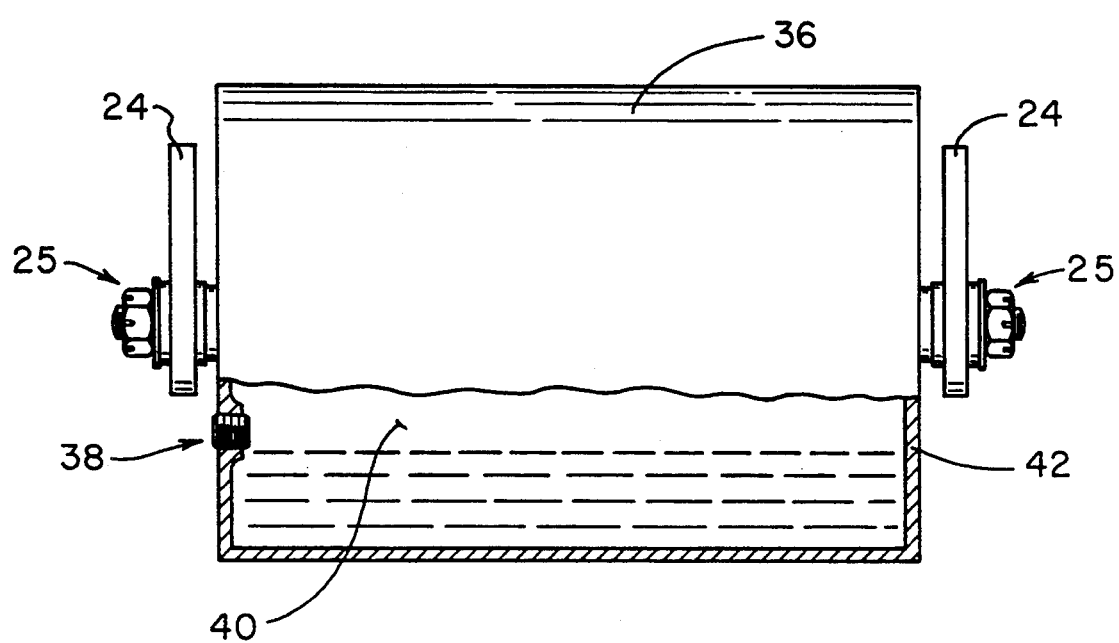
FIG. 6 is an enlarged front view, partially broken away, of the embodiment of the invention shown in FIG. 5.

Turning to FIGS. 5–6, a second embodiment of the invention is shown. Reference numerals are shown that correspond to like reference numerals that designate like elements shown in the other figures. In the second embodiment of the invention, the rollable lawn care assembly 22 includes a water-ballasted roller 36. The water-ballasted roller 36 includes a filler assembly 38 which permits addition of water to an interior chamber 40 of a roller element 42. Alternatively, the roller 36 can be ballasted with sand or other suitable material.

The components of the snow thrower to lawn care conversion apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a snow thrower to lawn care conversion apparatus that is low in cost, relatively simple in design and operation, and which may advantageously be used during times when not needed for throwing snow. With the invention, a snow thrower to lawn care conversion apparatus is provided which can be used for driving and supporting other land-treating tools besides a snow thrower auger. With the invention, a snow thrower to lawn care conversion apparatus is provided which used as a spiked aerator roller and a smooth-water-ballasted roller. With the invention, a snow thrower to lawn care conversion apparatus is provided which provides a common connector on the auger support for interchangeably supporting a spiked aerator roller and a smooth-water-ballasted roller. With the invention, a snow thrower to lawn care conversion apparatus is provided which provides a complementary connector on each of the spiked aerator roller and the smooth-water-ballasted roller that is interchangeable with the connector on the auger support. With the invention, a snow thrower to lawn care conversion apparatus is provided which can be adapted to become a self-propelled spiked aerator roller or a self-propelled smooth, water-ballasted roller. With the invention, a snow thrower to lawn care conversion apparatus is provided which permits a snow thrower to be converted to a lawn-treating device without using a mechanism for converting a vertically oriented power shaft to a horizontally oriented power shaft. With the invention, a snow thrower to lawn care conversion apparatus provides hardware for retrofitting a snow thrower into a lawn-treating device.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. An apparatus for a snow thrower which has a motor, a wheeled support for the motor, an auger, and a support for the auger, said apparatus for converting the snow thrower to a lawn care apparatus, said apparatus comprising:

a pair of lock assemblies connected to the auger support on opposite sides of the auger support, a rollable lawn care assembly, and a pair of strut members connected at opposite ends of said rollable lawn care assembly, wherein said strut members are adapted to connect with said lock assemblies on the auger support, wherein each of said lock assemblies includes a base plate attached to the auger support, a first bracket member attached to said base plate, said first bracket member for receiving a portion of one of said strut members, a second bracket member attached to said base plate, said second bracket member being spaced apart from said first bracket member such that a portion of one of said strut members is positioned between said first bracket member and said second bracket member such that said portion of one of said strut members is locked between said first bracket member and said second bracket member, whereby said strut member is locked onto said lock assembly, and wherein said second bracket member includes a plurality of adjustment slots for adjusting a space between said first bracket member and said second bracket member along said base plate.

2. The apparatus described in claim 1 wherein said rollable lawn care assembly includes a spiked aerator roller.

3. The apparatus described in claim 1 wherein said rollable lawn care assembly includes a water-ballasted roller.

4. The apparatus described in claim 3 wherein said water-ballasted roller includes a filler assembly which permits addition of water to an interior chamber of a roller element.

* * * * *